United States Patent Office

2,857,379
Patented Oct. 21, 1958

2,857,379

MORPHOLINOALKYLDITHIOCARBAMIC ACIDS

Bruce A. Ashby, Schenectady, N. Y., and Edgar C. Britton and Lee H. Horsley, Midland, Mich., assignors to The Dow Chemical Company, Midland, Mich., a corporation of Delaware No Drawing. Application September 9, 1957
Serial No. 682,609

5 Claims. (Cl. 260—247.1)

The present invention releates to morpholinoalkyldithiocarbamic acids and more particularly to the morpholinoalkyldithiocarbamic acids having the formula

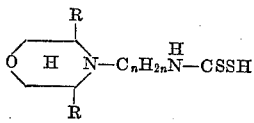

wherein, in this and succeeding formulae, n represents an integer from 2 to 3, inclusive and R represents hydrogen or methyl. The expression

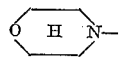

is employed in the present specification and claims to refer to saturated ring structures. The new compounds are substantially insoluble in most organic solvents and water. These new compounds have been found to be useful as parasiticides and are adapted to be employed as the active toxic ingredient in liquid and dust compositions for the control of many insect pests, fungi and bacteria.

The new compounds may be prepared by reacting carbon disulfide with a morpholino compound having the formula

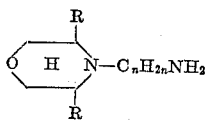

The reaction is somewhat exothermic and proceeds smoothly at temperatures of from 0° C. to about room temperature. The temperature conveniently may be controlled by regulating the rate of contacting the reactants and/or external cooling. Preferably the reaction may be carried out in the presence of an inert organic solvent such as benzene. Good results are obtained when employing substantially equimolecular proportions of the reactants.

In a preferred manner of carrying out the reaction of the present invention, carbon disulfide dissolved in an inert organic solvent, such as benzene, is slowly added portion-wise with stirring and cooling to the amine compound and at a temperature of between 0° C. and room temperature. The order of contacting the reactants is not critical and thus the amine compound may be added to the carbon disulfide. During the addition, a precipitate oftentimes forms in the reaction zone. Upon completion of the reaction, the precipitate which forms may be separated in conventional manner such as by filtration or decantation.

The following examples illustrate the present invention but are not to be construed as limiting.

*Example 1.—3-(morpholino)propyldithiocarbamic acid*

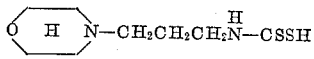

Carbon disulfide (38 grams; 0.5 mole) dissolved in 500 grams of benzene was slowly added to 72 grams (0.5 mole) of 1-(3-aminopropyl)morpholine. The addition was carried out with stirring and cooling and at a temperature of about 25° C. During the addition, a solid precipitated in the reaction mixture. Upon completion of the reaction, as evidenced by the substantial cessation of the formation of precipitate, the precipitate was separated by filtration to obtain 102 grams (93 percent yield) of a 3-(morpholino)propyldithiocarbamic acid product which was found to melt at 128°–130° C. (decomp.).

*Example 2.—2-(morpholino)ethyldithiocarbamic acid*

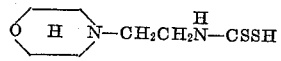

In an analogous manner employing 26 grams (0.2 mole) 1-(2-aminoethyl)morpholine in place of 1-(3-aminopropyl)morpholine, a (2-morpholinoethyl)dithiocarbamic acid was prepared. (2-(morpholino)ethyldithiocarbamic acid was found to melt at 125°–130° C.

*Example 3.—3-(2,6-dimethylmorpholino)propyldithiocarbamic acid*

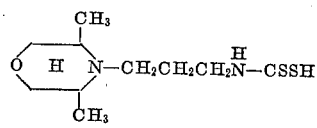

Carbon disulfide (38 grams; 0.5 mole) dissolved in 500 grams of benzene is slowly added to 86 grams (0.5 mole) of 1-(3-aminopropyl)-2,6-dimethylmorpholine. The addition is carried out with stirring and cooling and at a temperature of about 25° C. During the addition a precipitate formed in the reaction mixture. Upon completion of the reaction, as evidenced by the substantial cessation of formation of precipitate, the precipitate is separated by filtration to obtain a 3-(2,6-dimethylmorpholino) propyldithiocarbamic acid product. (3-(2,6-dimethylmorpholino)propyldithiocarbamic acid has a molecular weight of 248.

The compounds of the present invention have been tested and found to be effective as parasiticides. For such use, the products may be dispersed on an inert finely divided solid and employed as dusts. Also such mixtures may be dispersed in water with the aid of a wetting agent and the resulting aqueous suspensions employed as sprays. In other procedures, the products may be employed as constituents of oil-in-water emulsions or water dispersions with or without the aid of wetting, dispersing or emulsifying agents. In representative operations, a substantially complete control of *Fusarium oxysporum lycopersici* was obtained when 3-(morpholino)propyldithiocarbamic acid was distributed in the soil at a concentration of 10 parts per million parts of soil.

We claim:

1. A dithiocarbamic acid having the formula

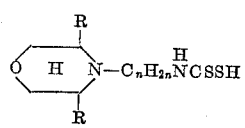

wherein n is an integer from 2 to 3, inclusive, and R represents a member selected from the group consisting of hydrogen and methyl.

2. 2-(morpholino)ethyldithiocarbamic acid.
3. 3-(morpholino)propyldithiocarbamic acid.
4. 3 - (2,6 - dimethylmorpholino)propyldithiocarbamic acid.

5. The method which comprises reacting carbon disulfide with a compound having the formula

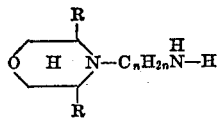

wherein $n$ is an integer from 2 to 3, inclusive, and R represents a member selected from the group consisting of hydrogen and methyl, and recovering a compound having the formula

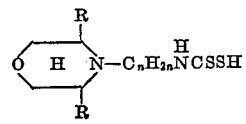

wherein $n$ is an integer from 2 to 3, inclusive, and R represents a member selected from the group consisting of hydrogen and methyl.

No references cited.